United States Patent
Sridhara

(10) Patent No.: US 12,499,140 B1
(45) Date of Patent: *Dec. 16, 2025

(54) DATABASE INTERFACE FRAMEWORK AND DATABASE AGENTS

(71) Applicant: CenturyLink Intellectual Property LLC, Denver, CO (US)

(72) Inventor: Srikanth Kumar Sridhara, Telangana (IN)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/210,804

(22) Filed: May 16, 2025

Related U.S. Application Data

(63) Continuation of application No. 19/188,173, filed on Apr. 24, 2025.

(60) Provisional application No. 63/773,707, filed on Mar. 18, 2025.

(51) Int. Cl.
*G06F 16/3329* (2025.01)
*G06F 16/21* (2019.01)
*G06F 16/383* (2019.01)
*G06F 40/20* (2020.01)

(52) U.S. Cl.
CPC .......... *G06F 16/3329* (2019.01); *G06F 16/21* (2019.01); *G06F 16/383* (2019.01); *G06F 40/20* (2020.01)

(58) Field of Classification Search
CPC .... G06F 16/3329; G06F 16/21; G06F 16/383; G06F 40/20
See application file for complete search history.

(56) References Cited

U.S. PATENT DOCUMENTS

| | | | |
|---|---|---|---|
| 2017/0123890 A1* | 5/2017 | Haridas | G06F 11/0769 |
| 2021/0248024 A1* | 8/2021 | Poola | G06F 11/0793 |
| 2024/0394251 A1* | 11/2024 | Brende | G06F 11/3409 |

OTHER PUBLICATIONS

Tueno, Natural Language Query Engine for Relational Databases using Generative AI, 2024, arXiv, whole document (Year: 2024).*

* cited by examiner

*Primary Examiner* — Sonia L Gay

(57) ABSTRACT

Novel tools and techniques are provided for implementing a database interface framework, database agents, and operations thereof. In examples, a database interface framework may receive a natural language ("NL") query from a requesting device, may translate the NL query into a database agent query language ("QL") query, and may send the database agent QL query to a database agent. For each of at least one database, the database agent may receive and translate the database agent QL query into a QL query, from a database agent QL to a database QL that is used by that database, may send the QL query to that database, may receive query results from that database, and may send the query results to the database interface framework. The database interface framework may receive and translate the query results into an NL response, and may send the NL response to the requesting device.

18 Claims, 7 Drawing Sheets

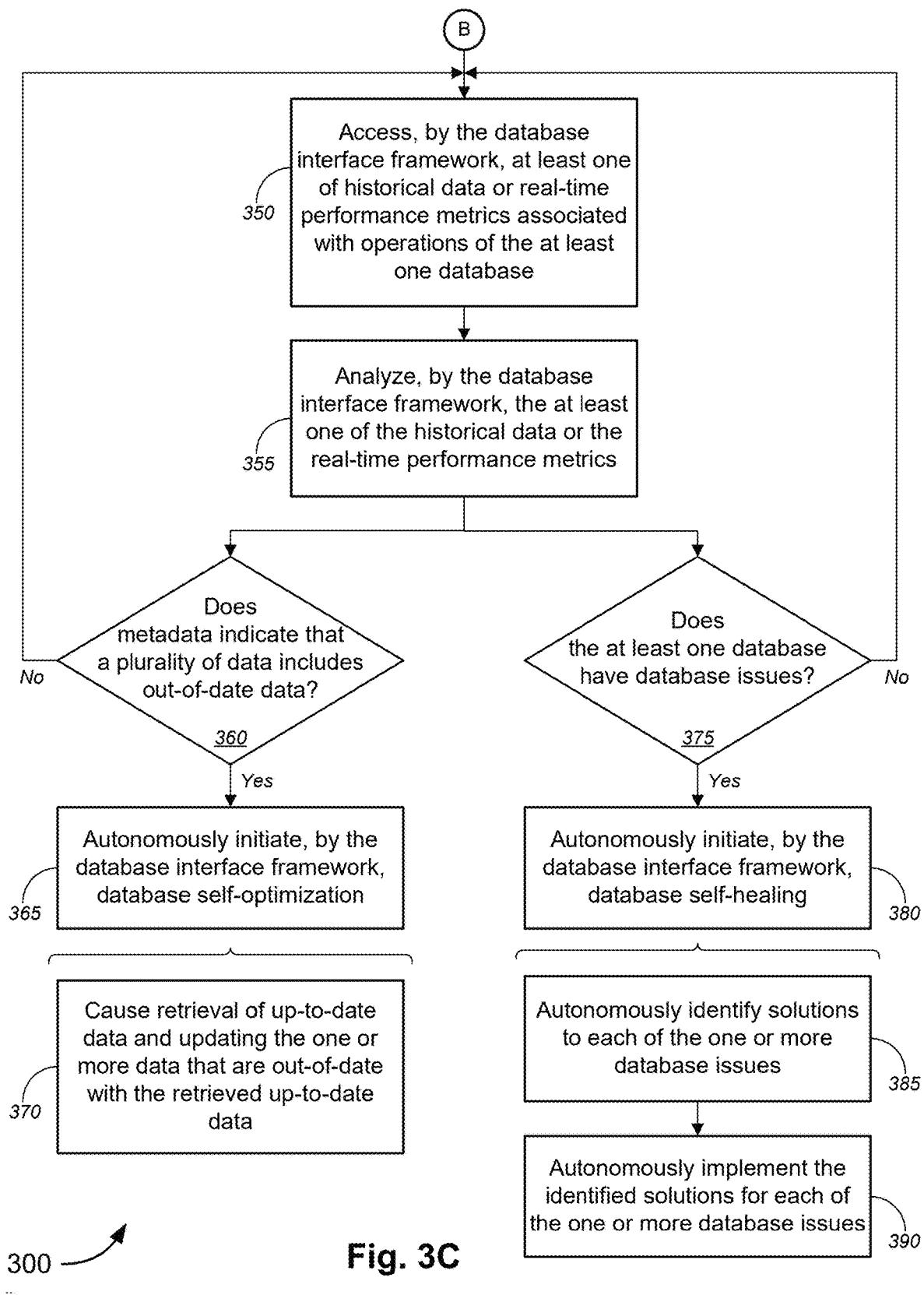

DATABASE INTERFACE FRAMEWORK AND DATABASE AGENTS

CROSS-REFERENCES TO RELATED APPLICATIONS

This application is a continuation of U.S. patent application Ser. No. 19/188,173 filed Apr. 24, 2025, which claims priority to U.S. Patent Application Ser. No. 63/773,707 (the "'707 Application"), filed Mar. 18, 2025, by Srikanth Kumar Sridhara, entitled, "Database Interface Framework and Database Agents," and may be related to U.S. Patent Application Ser. No. 63/773,724 (the "'724 Application"), filed Mar. 18, 2025, by Srikanth Kumar Sridhara, entitled, "Autonomous Database Architecture," the disclosure of each of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing database functionality, and, more particularly, to methods, systems, and apparatuses for implementing a database interface framework, database agents, and operations of the database interface framework and the database agents.

BACKGROUND

Managing modern databases is a complex undertaking, requiring specialized expertise, continuous monitoring, and resource allocation. Traditional database management systems ("DBMSs") require significant manual intervention for tasks such as query execution, optimization, scaling, security enforcement, and system monitoring. Existing systems are also reactive rather than proactive, often failing to predict and prevent issues before they occur. It is with respect to this general technical environment to which aspects of the present disclosure are directed.

BRIEF DESCRIPTION OF THE DRAWINGS

A further understanding of the nature and advantages of particular embodiments may be realized by reference to the remaining portions of the specification and the drawings, which are incorporated in and constitute a part of this disclosure.

FIGS. 3A-3C depict flow diagrams illustrating an example method for implementing a database interface framework, database agents, and operations of the database interface framework and the database agents, in accordance with various embodiments.

DETAILED DESCRIPTION OF CERTAIN EMBODIMENTS

Overview

Figure 1:
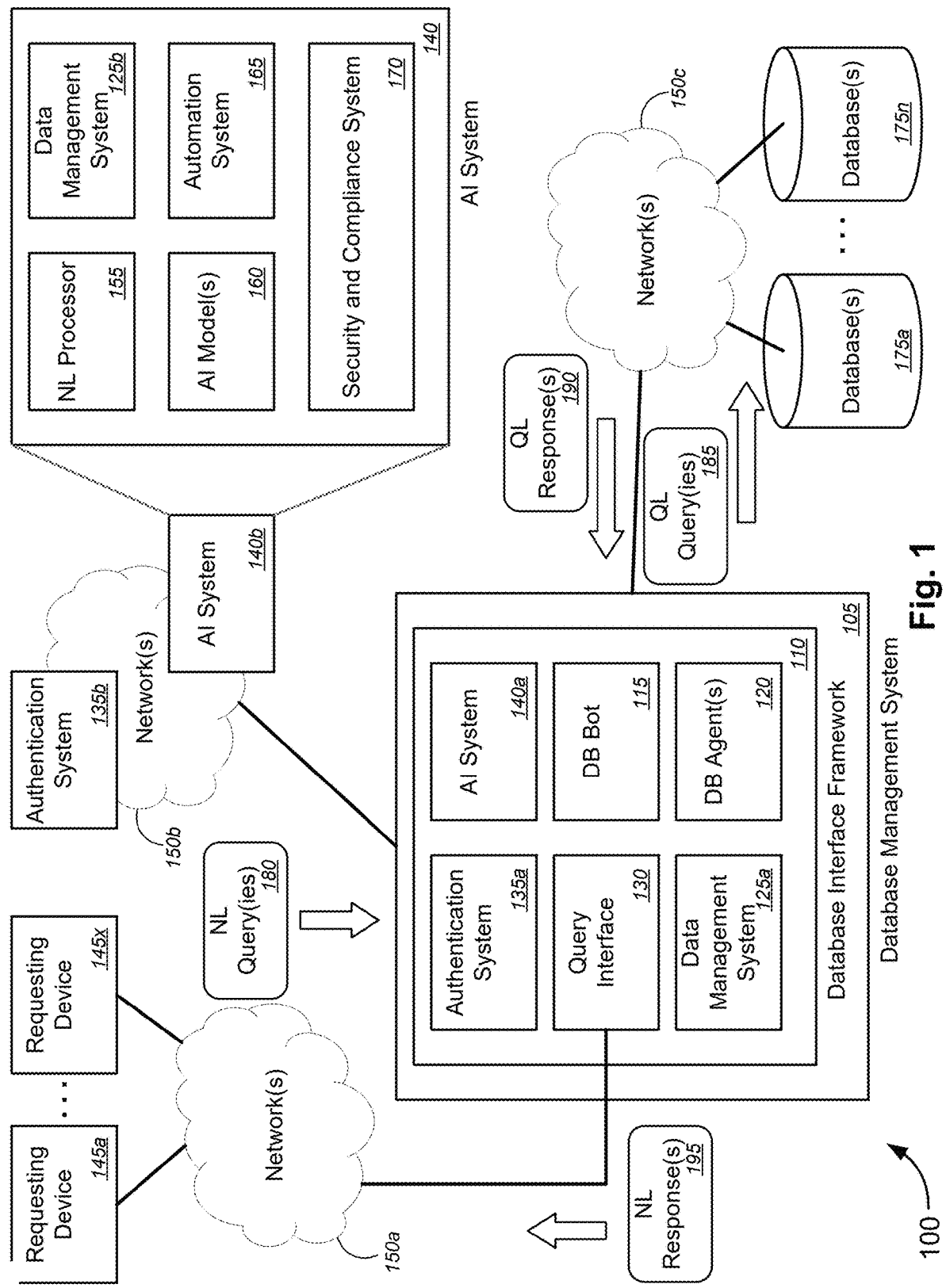
FIG. 1 depicts an example system for implementing a database interface framework, database agents, and operations of the database interface framework and the database agents, in accordance with various embodiments.

As briefly discussed above, traditional DBMSs require significant manual intervention for tasks such as query execution, optimization, scaling, security enforcement, and system monitoring. Such existing systems are also reactive rather than proactive, often unable to predict and prevent issues before they occur. Further, traditional DBMSs require individuals with database expertise to effectively query databases.

The present technology provides for a database interface framework, database agents, and operations of the database interface framework and the database agents. In examples, the present technology provides an autonomous database system that may utilize agentic artificial intelligence ("AI") to automate database management operations, in some cases, by integrating intelligent database agents capable of self-learning, decision-making, and seamless interaction with various data environments to ensure optimal performance, security, and scalability. The autonomous database system provides a fully self-governing solution for both structured and unstructured data environments, while minimizing human intervention by leveraging natural language processing ("NLP"), machine learning ("ML"), and multi-agent coordination. With natural language ("NL") queries as inputs, the autonomous database system enables non-database experts to initiate queries of databases, while enhancing query efficiencies and accuracies, by properly translating the NL queries into database-specific query language ("QL") queries (particularly where query languages differ amongst different databases).

In the manner above and as described in detail below, the agentic AI-powered autonomous database system enables improvement in reliability, while enhancing scalability and reducing operational costs. For example, predictive capabilities of the agentic AI-powered autonomous database system ensure higher reliability and performance. The agentic AI-powered autonomous database system adapts to dynamic workloads and threats using AI-driven scalability and security. Fully autonomous operations enable the agentic AI-powered autonomous database system to reduce operational costs and human error.

These and other aspects of the database interface framework, the database agents, and the operations of the database interface framework and the database agents are described in greater detail with respect to the figures.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In this detailed description, wherever possible, the same reference numbers are used in the drawing and the detailed description to refer to the same or similar elements. In some instances, a sub-label is associated with a reference numeral to denote one of multiple similar components. When reference is made to a reference numeral without specification to an existing sub-label, it is intended to refer to all such multiple similar components. In some cases, for denoting a plurality of components, the suffixes "a" through "n" may be used, where n denotes any suitable non-negative integer number (unless it denotes the number 14, if there are components with reference numerals having suffixes "a" through "m" preceding the component with the reference numeral having a suffix "n"), and may be either the same or different from the suffix "n" for other components in the same or different figures. For example, for component #1 X05a-X05n, the integer value of n in X05n may be the same or different from the integer value of n in X10n for component #2 X10a-X10n, and so on. In other cases, other suffixes (e.g., s, t, u, v, w, x, y, and/or z) may similarly denote non-negative integer numbers that (together with n or other like suffixes) may be either all the same as each other, all different from each other, or some combination of same and different (e.g., one set of two or more having the same values with the others having different values, a plurality of sets of two or more having the same value with the others having different values, etc.).

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Aspects of the present invention, for example, are described below with reference to block diagrams and/or operational illustrations of methods, systems, and computer program products according to aspects of the invention. The functions and/or acts noted in the blocks may occur out of the order as shown in any flowchart. For example, two blocks shown in succession may in fact be executed substantially concurrently or the blocks may sometimes be executed in the reverse order, depending upon the functionalities and/or acts involved. Further, as used herein and in the claims, the phrase "at least one of element A, element B, or element C" (or any suitable number of elements) is intended to convey any of: element A, element B, element C, elements A and B, elements A and C, elements B and C, and/or elements A, B, and C (and so on).

The description and illustration of one or more aspects provided in this application are not intended to limit or restrict the scope of the invention as claimed in any way. The aspects, examples, and details provided in this application are considered sufficient to convey possession and enable others to make and use the best mode of the claimed invention. The claimed invention should not be construed as being limited to any aspect, example, or detail provided in this application. Regardless of whether shown and described in combination or separately, the various features (both structural and methodological) are intended to be selectively rearranged, included, or omitted to produce an example or embodiment with a particular set of features. Having been provided with the description and illustration of the present application, one skilled in the art may envision variations, modifications, and alternate aspects, examples, and/or similar embodiments falling within the spirit of the broader aspects of the general inventive concept embodied in this application that do not depart from the broader scope of the claimed invention.

In an aspect, the technology relates to a method, including receiving, by a database interface framework and from a requesting device, a first query for accessing first data stored in at least one database among a plurality of databases within a private data environment. The first query may be an NL query. The plurality of databases may include a combination of structured and unstructured databases. Two or more of the plurality of databases may use corresponding two or more query languages that are different from each other. The method may further include causing, by the database interface framework, translation of the first query into a second query, from the NL query into a database agent query language that is used by a database agent within the private data environment, the database agent query language being different from the two or more query languages. The method may further include sending, by the database interface framework, the second query to the database agent, the second query causing the database agent to, for each of the at least one database: translate the second query into a QL query, from the database agent query language into a database query language that is used by that database among the at least one database; send the QL query to that database; receive query results from that database; and send the query results to the database interface framework. The method may further include receiving, by the database interface framework, the query results from each of the at least one database, via the database agent; causing, by the database interface framework, translation of the query results for the at least one database into an NL response; and sending, by the database interface framework, the NL response to the requesting device.

In another aspect, the technology relates to a system, including a database interface framework, and one or more database agents. The database interface framework may execute a first set of computer executable instructions that cause the database interface framework to perform first operations. Each of the one or more database agents may execute a second set of computer executable instructions that cause that database agent to perform second operations. The first operations may include: receiving, from a requesting device, a first query for accessing first data stored in at least one database among a plurality of databases within a private data environment, the first query being a NL query, the plurality of databases including a combination of structured and unstructured databases, two or more of the databases using corresponding two or more query languages that are different from each other; causing translation of the first query into a second query, from the NL query into a database agent query language that is used by a first database agent among the one or more database agents, the database agent query language being different from the two or more query languages; and sending the second query to the first database agent. The second operations may include: receiving the second query from the database interface framework; and for each of the at least one database, translating the second query into a QL query, from the database agent query language into a database query language that is used by that database among the at least one database; sending the QL query to that database; receiving query results from that database; and sending the query results to the database interface framework. The first operations may further include: receiving the query results from each of the at least one database, via the first database agent; causing translation of the query results for the at least one database into an NL response; and sending, by the database interface framework, the NL response to the requesting device.

In yet another aspect, the technology relates to a method, including: receiving, by a database agent and from a database interface framework, a first query for accessing first data stored in at least one database among a plurality of databases within a private data environment, the first query being in a database agent query language, the plurality of databases including a combination of structured and unstructured databases, two or more of the databases using corresponding two or more query languages that are different from each other and from the database agent query language; for each of at least database among the plurality of databases, determining, by the database agent, a database query language that is used by that database among the at least one database; translating, by the database agent, the first query into a QL query, from the database agent query language into the database query language that is used by that database; sending, by the database agent, the QL query to that database; receiving, by the database agent, query results from that database; and sending, by the database agent, the query results to the database interface framework.

Various modifications and additions can be made to the embodiments discussed herein without departing from the scope of the invention. For example, while the embodiments described above refer to particular features, the scope of this invention also includes embodiments having different combinations of features and embodiments that do not include all of the above-described features.

Specific Exemplary Embodiments

Turning to the embodiments as illustrated by the drawings, FIGS. 1-5 illustrate some of the features of methods, systems, and apparatuses for implementing database functionality, and, more particularly, to methods, systems, and apparatuses for implementing a database interface framework, database agents, and operations of the database interface framework and the database agents, as referred to above. The methods, systems, and apparatuses illustrated by FIGS. 1-5 refer to examples of different embodiments that include various components and steps, which can be considered alternatives or which can be used in conjunction with one another in the various embodiments. The description of the illustrated methods, systems, and apparatuses shown in FIGS. 1-5 is provided for purposes of illustration and should not be considered to limit the scope of the different embodiments.

With reference to the figures, FIG. 1 depicts an example system 100 for implementing a database interface framework, database agents, and operations of the database interface framework and the database agents, in accordance with various embodiments.

In the non-limiting embodiment of FIG. 1, system 100 may include database management system 105, which may include database interface framework 110, a database ("DB") bot 115, a DB agent(s) 120, a data management system 125a, a query interface 130, an authentication system 135a, and an AI system 140a. In some examples, the DB bot 115, the DB agent(s) 120, the data management system 125a, the query interface 130, the authentication system 135a, and the AI system 140 may be part of the database interface framework 110. In examples, the database interface framework 110 (and the database management system 105) may communicatively couple with a requesting device among a plurality of requesting devices 145a-145x (collectively, "requesting devices 145" or the like), via network(s) 150a. In some cases, instead of an authentication system 135a that is local to the database management system 105, a remote authentication system 135b (which may be a server-based system or a cloud-based system, or the like) may be used that is accessible by database interface framework 110 (and the database management system 105) via network(s) 150b. Similarly, rather than an AI system 140a that is local to the database management system 105, a remote AI system 140b (which may likewise be a server-based system or a cloud-based system, or the like) may be used that is accessible by database interface framework 110 (and the database management system 105) via network(s) 150b.

In some examples, the AI system 140a or 140b (collectively, "AI system 140" or the like) may include an NL processor 155, one or more AI models 160, and at least one of a data management system 125b, an automation system 165, and/or a security and compliance system 170. The NL processor 155 is an ML tool that enables computers to interpret, manipulate, and comprehend human language, and that performs tasks including speech recognition, text classification, NL understanding, and NL generation, and/or the like. AI models 160 may include a language model (e.g., a large language model ("LLM"), etc.), an ML model, a logistic regression model, a neural network, and/or the like. Data management system 125a or 125b may be used to retrieve, organize, and/or store data from/in database(s) 175a-175n. In some cases, the data management system 125a or 125b may perform data management tasks including at least one of data modeling (e.g., to create a database schema for how data should be organized and structured, or the like), data definition (e.g., to define and manage database schemas using a data definition language, or the like), data storage (e.g., to create, modify, and remove database structures, includes tables, indexes and relationships, or the like), data security (e.g., to protect data from unauthorized access, breaches, and corruption, or the like), and/or data governance (e.g., to establish policies, procedures, and accountability rules for managing data, or the like), or the like. Automation system 165 may be used to automate translation between NL queries and QL queries, etc. Security and compliance system 170 may be used to encrypt connections between components of the database management system 105 (and, in some cases, between the database management system 105 and the one or more databases 175a-175n) and to implement strict access controls to data being processed using the AI system 140a or 140b (e.g., data accessed from database(s) 175a-175n, or the like).

In examples, system 100 may further include a plurality of databases 175a-175n (collectively, "databases 175" or the like), which may be part of or located within one of a private data environment or a cloud environment, or the like. The plurality of databases 175 may include a combination of structured and unstructured databases, two or more of the plurality of databases using corresponding two or more query languages that are different from each other. As used herein, a structured database may refer to a database or database management system that stores data in a structured format and, in some cases, may use structured query language ("SQL") for querying and updating the database, or the like, and may include relational databases or relational database management systems ("RDBMSs"). An unstructured database, as used herein, may refer to a database or database management system that stores data without a predefined structure, and may include not-only-SQL ("NoSQL") databases or NoSQL database management systems, or the like. In examples, the data stored in the structured database or stored in the unstructured database may include at least one of text-based data, image data, audio data, and/or video data, or the like. Herein, n and x are non-negative integer numbers that may be either all the same as each other, all different from each other, or some combination of same and different (e.g., one set of two or more having the same values with the others having different values, a plurality of sets of two or more having the same value with the others having different values, etc.).

In some examples, the plurality of requesting devices 145a-145x may each include, but is not limited to, one of a desktop computer, a laptop computer, a tablet computer, a smart phone, a mobile phone, or a server computer, and/or the like. In some cases, a user of the requesting devices 145 may include a user among a range of user groups within an organization, as well as external customers, depending on use case. In examples, the user groups may include non-technical business users, customer support team members, information technology ("IT") and database administrators, data analysts and managers, and/or external customers or end-users, or the like. In some instances, non-technical business users may include sales, marketing, and/or operations teams, who often require access to data insights, but may not have technical expertise. The database interface framework 110 and/or the DB bot 115 may allow such users to easily retrieve customer data, analyze sales trends, and/or monitor key metrics, and/or the like. In some cases, non-technical business users may alternatively include executives and/or decision-makers, or the like. The database interface framework 110 and/or the DB bot 115 may provide such leaders with immediate access to data insights, enabling faster, data-driven decision-making without having to wait for reports from data teams.

In examples, customer support team members may include customer support representatives who can use the database interface framework 110 and/or the DB bot 115 to quickly retrieve customer account information and/or purchase histories, and to resolve customer inquiries more efficiently. By offering real-time responses, the database interface framework 110 and/or the DB bot 115 may help support teams provide faster, more informed customer service, enhancing the overall customer experience. In some examples, while the database interface framework 110 and/or the DB bot 115 may be intended to minimize dependence on IT for basic queries, IT and database administrators can use the database interface framework 110 and/or the DB bot 115 as a tool to reduce routine support requests, allowing them to focus on higher-level tasks. In examples, the database interface framework 110 and/or the DB bot 115 may also serve as an internal tool for IT administrators to monitor database health or log system usage metrics, helping them maintain performance and security. In some cases, data analysts and managers can use the database interface framework 110 and/or the DB bot 115 as a quick reference tool for accessing certain datasets or verifying data points without needing to manually query the database. The database interface framework 110 and/or the DB bot 115 can also aid data managers by generating automated reports or alerts, ensuring they have up-to-date information at hand without running frequent manual reports. In some instances, in customer-facing use cases, the database interface framework 110 and/or the DB bot 115 can serve as a virtual assistant for end-users, allowing customers to self-serve for information about their accounts, usage, or transactions. The database interface framework 110 and/or the DB bot 115 can enhance customer satisfaction by reducing wait times and empowering customers to access their own data whenever they need it.

According to some embodiments, unless otherwise indicated, networks 150a-150c may each include, without limitation, one of a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the networks 150a-150c may include an access network of the service provider (e.g., an Internet service provider ("ISP")). In another embodiment, the networks 150a-150c may include a core network of the service provider and/or the Internet.

In some aspects, a requesting device 145, among the plurality of requesting devices 145a-145x, may send an NL query(ies) 180 to database management system 105 via network(s) 150a. In some examples, database interface framework 110 of the database management system 105 (and/or a DB bot 115 thereof) may receive the NL query(ies) 180 via query interface 130, which may include at least one of an interface connector, an application programming interface ("API"), or a portal, and/or the like. In examples, the NL query(ies) 180 may include at least one of a text-based NL query, a chat-based NL query, a search engine-based NL query, an email-based NL query, a voice-based NL query, or a video-based NL query, and/or the like. In examples, authentication system 135a or 135b may be used to authenticate the requesting device 145 and/or the user associated with the requesting device 145. In the case the authentication fails, the requesting device 145 and/or the user would be blocked from accessing data stored in the databases 175a-175n. On the other hand, after the requesting device 145 and/or the user has been successfully authenticated, the database interface framework 110 and/or the DB bot 115 may initiate processes for accessing data stored in the database(s) 175*a*-175*n*, in response to the NL query(ies) 180, as described in detail below.

The database interface framework 110 and/or the DB bot 115 may cause translation of the NL query(ies) 180 into a database agent query, from the natural language of the NL query(ies) 180 to a database agent query language that is used by the database agent 120, and may send the database agent query to the database agent 120. In some cases, the database agent query language may be different from the two or more query languages used by the two or more of the plurality of databases 175*a*-175*n*. In examples, the database agent 120 may access data stored in at least one database among the plurality of databases 175*a*-175*n*, by, for each of the at least one database: (a) translating the database agent query into a QL query(ies) 185, from the database agent QL into a database QL that is used by that database among the at least one database 175; (b) sending the QL query(ies) 185 to that database; (c) receiving QL response(s) 190 (e.g., query results) from that database; and (d) sending the QL response(s) 190 to the database interface framework 110 and/or the DB bot 115. The database interface framework 110 and/or the DB bot 115 may receive the QL response(s) 190 from each of the at least one database 175, via the database agent 120. The database interface framework 110 and/or the DB bot 115 may cause translation of the QL response(s) 190 for the at least one database into an NL response(s) 195, and may send the NL response(s) 195 to the requesting device 145. In this manner, the database interface framework 110, the DB bot 115, and/or the database agent(s) 120 may serve as an intermediary between the requesting device 145 and the at least one database 175, by performing appropriate translations and communications. Further, unlike traditional agents in database systems that only process input data and output results, the database agent(s) 120 may perform a combination of perceiving the data environment, processing input data, making decisions, planning and executing an action, and implementing learning and improvements, and/or the like.

In examples, the database interface framework 110 and/or the DB bot 115, using advanced AI algorithms, may learn and adapt to a database environment of an entity (e.g., an enterprise entity, an individual user, or other entity), may analyze patterns to predict database needs and to provide actionable insights, in some cases, in real-time or near-real-time. With encrypted connections and strict access controls (e.g., via use of the authentication system 135*a* and/or 135*b*, and/or via use of the security and compliance system 170, or the like), the database interface framework 110 and/or the DB bot 115 ensures that data stored in the databases 175*a*-175*n* remain safe and compliant with industry standards (i.e., remaining untouched and unavailable to third parties). In this manner, the database interface framework 110 and/or the DB bot 115 may simplify and optimize the complex field of data management, while ensure that the underlying data remains secure.

Figure 2:
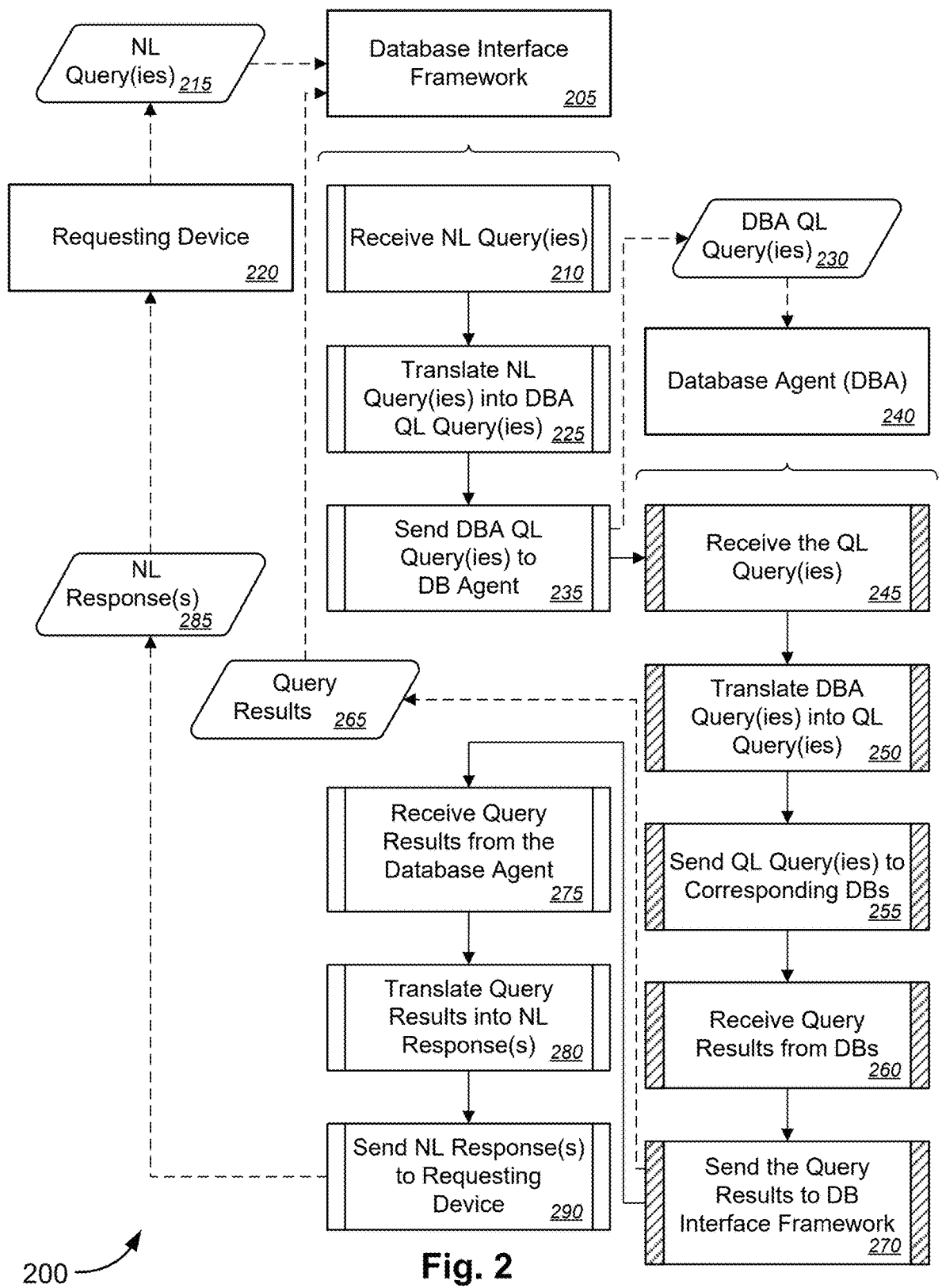
FIG. 2 depicts an example sequence flow for implementing database interface framework and database agent operations, in accordance with various embodiments.
Figure 3A:
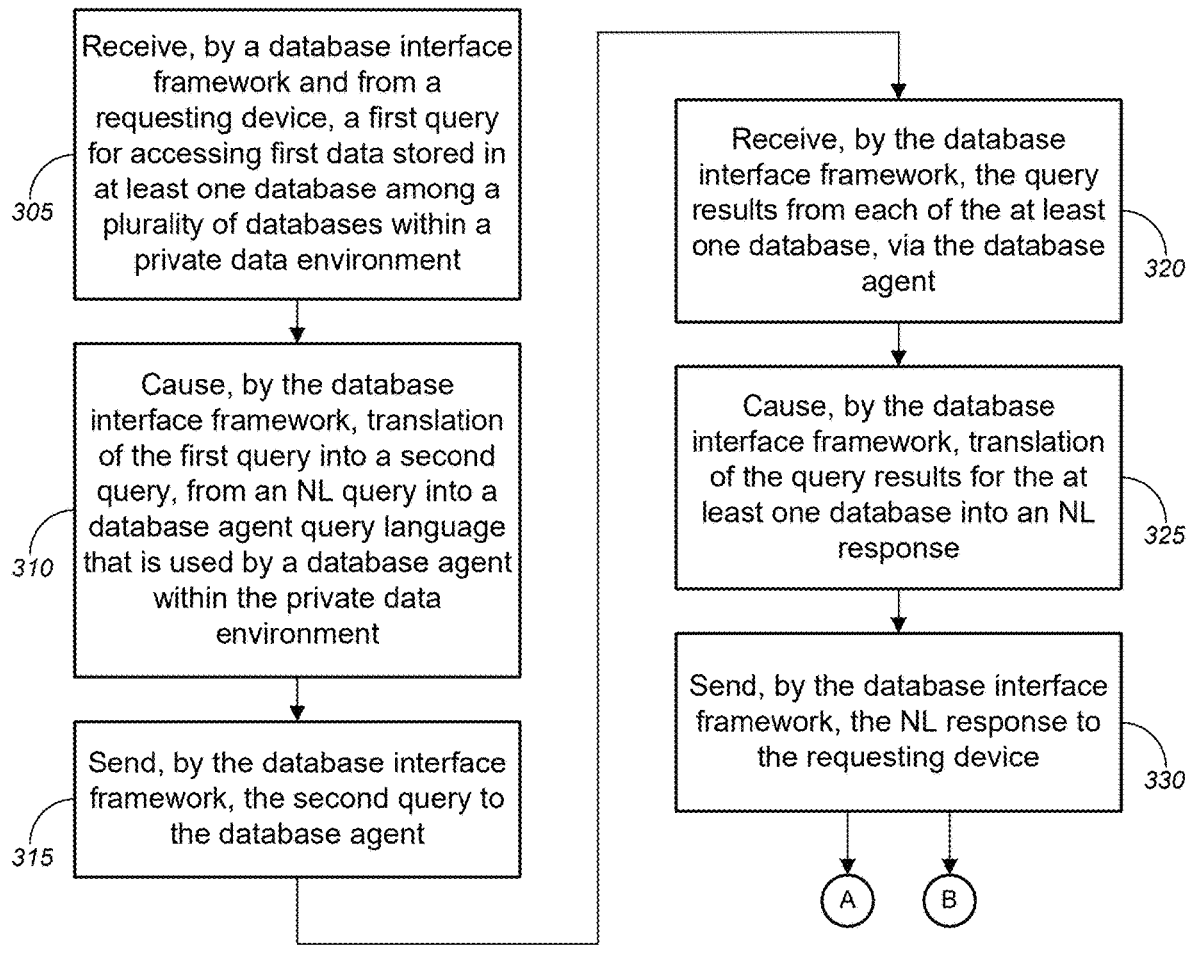
Figure 3B:
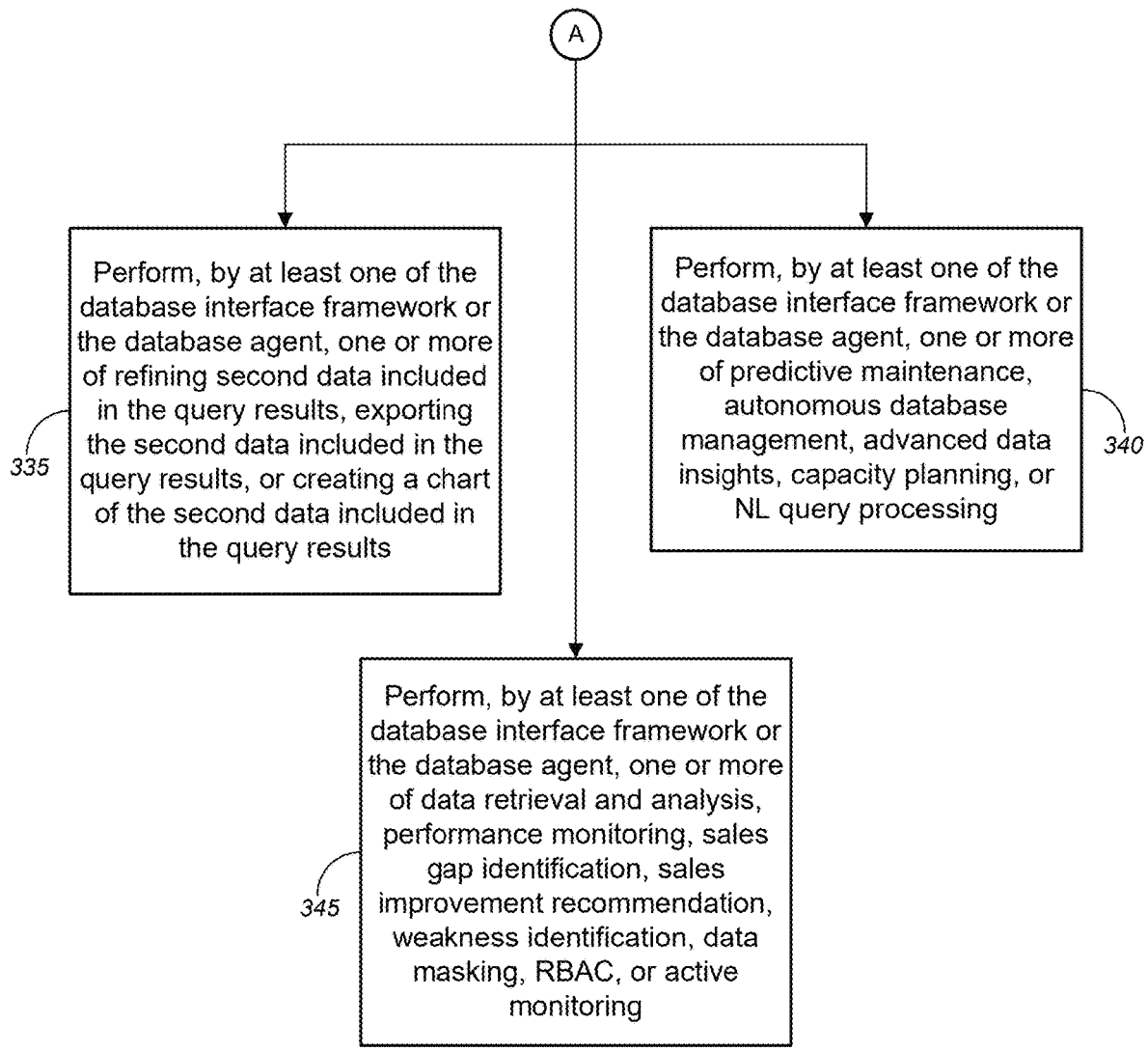
Figure 4:
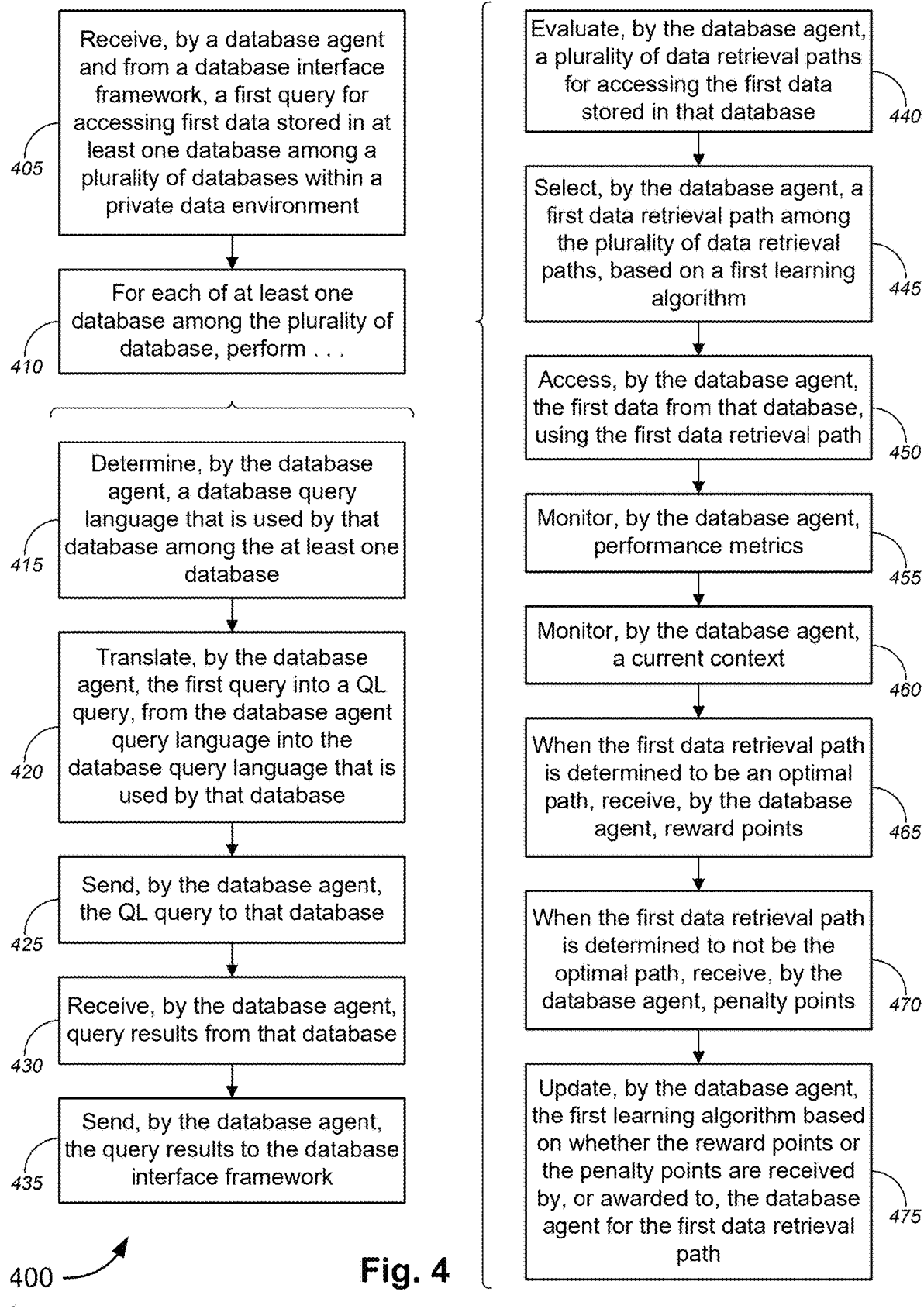
FIG. 4 depicts a flow diagram illustrating another example method for implementing a database interface framework, database agents, and operations of the database interface framework and the database agents, in accordance with various embodiments.

In operation, database interface framework 110 and/or database agent(s) 120 may perform methods for implementing the database interface framework, the database agents, and the operations of the database interface framework and the database agents, as described in detail with respect to FIGS. 2-4. For example, example sequence flow 200 as described below with respect to FIG. 2, and methods 300 and 400 as described below with respect to FIGS. 3 and 4 may be applied with respect to the operations of system 100 of FIG. 1.

In various aspects, an autonomous database system is provided that may utilize agentic AI to automate database management operations, in some cases, by integrating intelligent database agents (e.g., database agent(s) 120, in some instances, powered by AI system 140*a* or 140*b*, or the like) capable of self-learning, decision-making, and seamless interaction with various data environments to ensure optimal performance, security, and scalability. The autonomous database system minimizes human intervention by leveraging NLP, ML, and multi-agent coordination. In examples, the agentic AI may include features or functionalities including, but not limited to, at least one of self-learning capabilities, an NL interface, a multi-agent architecture, proactive decision-making, or security and compliance, and/or the like. In some cases, the agentic AI may be used to optimize operations by using self-learning capabilities to perform continuous analysis of historical data and real-time performance metrics, and to perform adaptive query optimization using ML algorithms, or the like. Alternatively or additionally, in some instances, the agentic AI may translate user input into system-understandable commands by using a conversational interface powered by NLP (e.g., using NL processor 155 or the like). Alternatively or additionally, in some examples, the agentic AI may utilize agents with specialized roles (e.g., performance monitoring, security management, data integrity, and/or the like) that collaborate seamlessly with each other. Alternatively or additionally, in examples, the agentic AI may predict issues, may identify solutions to potential issues as predicted, and may preemptively address the potential issues, using proactive decision-making and predictive maintenance functionalities. Alternatively or additionally, in some cases, the agentic AI may utilize AI-driven monitoring (e.g., in security and compliance system 170 of AI system 140, or the like) to autonomously enforce security policies and compliance requirements.

The agentic AI-powered autonomous database system enables full autonomy, with features including at least one of database self-configuration, database self-healing, database self-optimization, and/or database self-protection, and/or the like, thereby minimizing the need for human interaction. The agentic AI-powered autonomous database system is database agnostic, being compatible with structured databases (e.g., relational databases or RDBMSs, such as databases using SQL, or the like) as well as unstructured databases (e.g., NoSQL databases or NoSQL database management systems, or the like). The agentic AI-powered autonomous database system provides for high scalability, by using dynamic resource allocation to manage large datasets efficiently. In some examples, the agentic AI-powered autonomous database system enables multi-platform support that provides functionality across different environments including on-premises, cloud, and/or hybrid environments, or the like. In examples, the agentic AI-powered autonomous database system enables Enterprise data management with minimal overhead. In some cases, the agentic AI-powered autonomous database system provides real-time analytics and insights for business intelligence. Alternatively or additionally, in some instances, the agentic AI-powered autonomous database system enables secure and compliant data handling for industries including healthcare, finance, and/or the like. In some cases, the agentic AI-powered autonomous database system may be deployed using scalable cloud infrastructure. In the manner above, by leveraging agentic AI, the system provides a robust, scalable, and intelligent solution to the challenges of modern data environments.

Further, by training a database bot 115 of database interface framework 110 and/or training a database agent(s) 120 to access data from databases 175*a*-175*n*, the database bot 115 and/or the database interface framework 110 is enabled to translate NL query(ies) 180 into database agent QL, and to cause the database agent(s) 120 to determine QLs that are used by the databases 175*a*-175*n*, to translate the database agent QL into the determined QLs for databases 175 identified to contain data requested from the NL query(ies) 180. The database bot 115 and/or the database interface framework 110 is further enabled to translate QL responses 190 into NL responses 195. Such training is used for third party databases or DBMSs that are provisioned, serviced, or operated by third party service providers. Alternatively, for data that is not ingested or migrated into local databases, as described in detail in the '724 Application, which has been incorporated herein by reference in its entirety for all purposes, it is not necessary for a database bot of a database interface framework and/or database agents to be trained to access data (by translating NL query(ies) into database agent QL and determined QLs) from external databases.

FIG. 2 depicts an example sequence flow 200 for implementing database interface framework and database agent operations, in accordance with various embodiments. In some embodiments, database interface framework 205, NL query(ies) 215, requesting device 220, database agent 240, and NL response(s) 285 of FIG. 2 may be similar, if not identical, to the database interface framework 110, NL query(ies) 180, requesting devices 145*a*-145*x*, and database agent(s) 120, respectively, of system 100 of FIG. 1, and the description of these components of system 100 of FIG. 1 are similarly applicable to the corresponding components of FIG. 2. In FIG. 2, solid lined arrows from one process block to another (e.g., among process blocks 210, 225, 235, 245-260, 270, 275, 280, and 290) correspond to the operations that are part of example sequence flow 200, where process blocks with blank side portions correspond to operations performed by the database interface framework 205 (e.g., operations 210, 225, 235, 275, 280, and 290), while the process blocks with shaded side portions correspond to operations performed by the database agent 240 (e.g., operations 245, 250, 255, 260, and 270). Further in FIG. 2, the dash-lined arrows are associated with queries or results/responses being sent to or from devices (e.g., database interface framework 205, requesting device 220, and database agent 240).

With reference to FIG. 2, example sequence flow 200 may include database interface framework 205 receiving, at operation 210, NL query(ies) 215 from requesting device 220 (as depicted in FIG. 2 by the dash-lined arrows from the requesting device 220 to the database interface framework 205). At operation 225, the database interface framework 205 may translate the NL query(ies) 215 into database agent ("DBA") QL query(ies) 230, the DBA QL query(ies) 230 being in a query language that is used by the database agent 240. At operation 235, the database interface framework 205 may send the DBA QL query(ies) 230 to the database agent 240 (as depicted in FIG. 2 by the dash-lined arrows from the process block for operation 235 to the database agent 240).

At operation 245, the database agent 240 may receive the DBA QL query(ies) 230. At operation 250, the database agent 240 may translate the DBA QL query(ies) 230 into QL query(ies), each QL query(ies) being in a query language, among a plurality of query languages, that is used by a database, among one or more databases, to which that QL query(ies) is to be sent, and may send that QL query(ies) to that database (at operation 255). At operation 260, the database agent 240 may receive query results 265 from the one or more databases. At operation 270, the database agent 240 may send the query results 265 to the database interface framework 205 (as depicted in FIG. 2 by the dash-lined arrows from the process block for operation 270 to the database interface framework 205). In an example, the database agent 240 may receive query results 265 from each of the one or more databases prior to sending all the received query results 265 (in some cases, either compiling the query results 265 in a single file for sending to the database interface framework 205, or sending the individual query results 265 to the database interface framework 205). Alternatively, the database agent 240 may send query results 265 from each of the one or more databases as they are received, with the database interface framework 205 collecting and compiling the query results 265 from each of the at least one database after all have been received.

At operation 275, the database interface framework 205 may receive the query results 265 from the database agent 240. At operation 280, the database interface framework 205 may translate the query results into NL response(s) 285. At operation 290, the database interface framework 205 may send the NL response(s) 285 to the requesting device 220 (as depicted in FIG. 2 by the dash-lined arrows from the process block for operation 290 to the requesting device 220).

FIGS. 3A-3C (collectively, "FIG. 3") depict flow diagrams illustrating an example method 300 for implementing a database interface framework, database agents, and operations of the database interface framework and the database agents, in accordance with various embodiments. With reference to FIGS. 3A-3C, the operations of example method 300 may be performed by a database interface framework (e.g., database interface framework 110 or 205 of FIG. 1 or 2, or the like) and/or a database agent (e.g., database agent(s) 120 or 240 of FIG. 1 or 2, or the like). Method 300 of FIG. 3A either may continue onto FIG. 3B following the circular marker denoted, "A," or may continue onto FIG. 3C following the circular marker denoted, "B."

In the example method 300 of FIG. 3A, at operation 305, a database interface framework may receive, from a requesting device (e.g., one of requesting devices 145*a*-145*x* or requesting device 220 of FIG. 1 or 2, or the like), a first query for accessing first data stored in at least one database among a plurality of databases (e.g., databases 175*a*-175*n* of FIG. 1, or the like), in some cases, within a private data environment. The first query may be an NL query (e.g., NL query(ies) 180 or 215 of FIG. 1 or 2, or the like). In some examples, the plurality of databases may include a combination of structured and unstructured databases. In some cases, two or more of the plurality of databases may use corresponding two or more query languages that are different from each other. In examples, the first query may include at least one of a text-based NL query, a chat-based NL query, a search engine-based NL query, an email-based NL query, a voice-based NL query, or a video-based NL query, and/or the like. In some instances, the first query may be received from the requesting device via at least one of an interface connector, an API, or a portal, and/or the like (e.g., query interface 130 of FIG. 1, or the like).

At operation 310, the database interface framework may cause translation of the first query into a second query, from the NL query into a database agent query language that is used by a database agent, in some cases, within the private data environment. In some instances, the database agent query language may be different from the two or more query languages. In some examples, after receiving the first query from the requesting device, the database interface framework may cause initiation of an authentication process for authenticating a requesting user associated with the requesting device, in some cases, by sending an authentication request for authenticating the requesting user to an authentication system (e.g., authentication system 135a or 135b of FIG. 1, or the like). In examples, causing translation of the first query into the second query (at operation 310) may be performed in response to receiving an indication that the requesting user is authenticated.

At operation 315, the database interface framework may send the second query (e.g., DBA QL query(ies) 230 of FIG. 2, or the like) to the database agent. In examples, the second query may cause the database agent to, for each of the at least one database: (a) translate the second query into a QL query (e.g., QL query(ies) 185 of FIG. 1, or the like), from the database agent query language into a database query language that is used by that database among the at least one database; (b) send the QL query to that database; (c) receive query results (e.g., QL response(s) 190 or 265 of FIG. 1 or 2, or the like) from that database; and (d) send the query results to the database interface framework. In examples, the database interface framework may provide the database agent with access to database features, which may include at least one of database self-configuration, database self-healing, database self-optimization, database self-protection, or data integrity, and/or the like.

At operation 320, the database interface framework may receive the query results from each of the at least one database, via the database agent. At operation 325, the database interface framework may cause translation of the query results for the at least one database into an NL response (e.g., NL response(s) 195 or 285 of FIG. 2, or the like). At operation 330, the database interface framework may send the NL response to the requesting device.

In an example, method 300 may continue onto one or more of the process at operation 335, the process at operation 340, and/or the process at operation 345 in FIG. 3B, following the circular marker denoted, "A." Alternatively or additionally, in another example, method 300 may continue onto the process at operation 350 in FIG. 3C, following the circular marker denoted, "B."

At operation 335 in FIG. 3B (following the circular marker denoted, "A," in FIG. 3A), method 300 may include the at least one of the database interface framework or the database agent performing one or more of refining second data included in the query results, exporting the second data included in the query results, or creating a chart of the second data included in the query results, and/or the like. In some cases, the first data may correspond to the second data. Alternatively or additionally, at operation 340 in FIG. 3B (following the circular marker denoted, "A," in FIG. 3A), method 300 may include the at least one of the database interface framework or the database agent performing one or more of predictive maintenance, autonomous database management, advanced data insights, capacity planning, or NL query processing, and/or the like, in some cases, using at least one of one or more AI models or computational intelligence, and/or the like. In some instances, the predictive maintenance may include at least one of proactive issue resolution or workload forecasting. In some cases, the autonomous database management may include at least one of database self-optimization or database self-healing, and/or the like. In some examples, the advanced data insights may include at least one of pattern recognition or advanced query recommendation, and/or the like. In examples, the capacity planning may include at least one of storage management or resource optimization, and/or the like. In some instances, the NL query processing may include at least one of AI-driven query conversion or context-aware assistance, and/or the like.

Alternatively or additionally, at operation 345 in FIG. 3B (following the circular marker denoted, "A," in FIG. 3A), method 300 may include the at least one of the database interface framework or the database agent performing one or more of data retrieval and analysis, performance monitoring, sales gap identification, sales improvement recommendation, weakness identification, data masking, RBAC, or active monitoring, and/or the like. In some cases, the data retrieval and analysis may include at least one of automated data retrieval and reporting, or workflow streamlining through customer relationship management ("CRM") integration, and/or the like. In some instances, the performance monitoring may include at least one of lifecycle event monitoring, sales feedback monitoring, or database monitoring, and/or the like. In some examples, the sales gap identification may include at least one of identification of underperforming sales regions, identification of underperforming sales products, sales forecasting based on predictive analysis, sales planning based on predictive analysis, or sales strategy adjustment based on trends and market conditions, and/or the like. In examples, the sales improvement recommendation may include at least one of data-driven identification of high-value customers, data-driven identification of trends, data-driven identification of profitable opportunities, or actionable recommendations that enhance conversion rates, and/or the like.

At operation 350 in FIG. 3C (following the circular marker denoted, "A," in FIG. 3A), method 300 may include the database interface framework accessing at least one of historical data or real-time performance metrics associated with operations of the at least one database. At operation 355, the database interface framework may analyze the at least one of the historical data or the real-time performance metrics. Method 300 either may continue onto the process at operation 360 and/or may continue onto the process at operation 375.

At operation 360, the database interface framework may determine or may identify whether metadata associated with a plurality of data stored on the at least one database indicates that the plurality of data includes out-of-date data, based on analysis of the at least one of the historical data or the real-time performance metrics. Based on a determination that the metadata associated with the plurality of data does not indicate that the plurality of data includes data that are out-of-date, method 300 may return to the process at operation 350. Based on a determination that the metadata associated with the plurality of data indicates that the plurality of data includes one or more data that are out-of-date, the database interface framework may autonomously initiate database self-optimization (at operation 365), in some cases, by causing retrieval of up-to-date data and updating the one or more data that are out-of-date with the retrieved up-to-date data (at operation 370).

Alternatively or additionally, at operation 375, the database interface framework may determine or may identify whether the at least one database has database issues, which may include at least one of a corrupted database index, a missing database index, or an inefficient database index query function. Based on a determination that the at least one database does not have any known database issues, method 300 may return to the process at operation 350. Based on a determination that the at least one database has one or more database issues, the database interface framework may autonomously initiate database self-healing (at operation 380), in some cases, by autonomously identifying solutions to each of the one or more database issues (at operation 385) and autonomously implementing the identified solutions for each of the one or more database issues (at operation 390). In examples, the database interface framework may train an AI model to identify a plurality of corrupted database indexes (e.g., 1,000,000 indexes, or the like) based on a subset of example corrupted database indexes (e.g., 10 or 12 example indexes, or the like), and the database self-healing (at operation 380) may be autonomously initiated using the trained AI model.

FIG. 4 depicts a flow diagram illustrating another example method 400 for implementing a database interface framework, database agents, and operations of the database interface framework and the database agents, in accordance with various embodiments. Referring to FIG. 4, the operations of example method 400 may be performed by a database agent (e.g., database agent(s) 120 or 240 of FIG. 1 or 2, or the like).

In the example method 400 of FIG. 4, at operation 405, a database agent may receive, from a database interface framework (e.g., database interface framework 110 or 205 of FIG. 1 or 2, or the like), a first query for accessing first data stored in at least one database among a plurality of databases (e.g., databases 175a-175n of FIG. 1, or the like), in some cases, within a private data environment. In some cases, the first query may be in a database agent query language (e.g., DBA QL query(ies) 230 of FIG. 2, or the like). In some instances, the plurality of databases may include a combination of structured and unstructured databases. In examples, two or more of the databases may use corresponding two or more query languages that are different from each other and from the database agent query language. For each of at least database among the plurality of databases (at operation 410), the database agent may perform processes at operations 415-435 and/or may perform processes at operations 440-475.

For instance, with reference to operations 415-435, for each of the at least one database, the database agent may determine a database query language that is used by that database among the at least one database (at operation 415); may translate the first query into a QL query (e.g., QL query(ies) 185 of FIG. 1, or the like), from the database agent query language into the database query language that is used by that database (at operation 420); may send the QL query to that database (at operation 425); may receive query results (e.g., QL response(s) 190 or 265 of FIG. 1 or 2, or the like) from that database (at operation 430); and may send the query results to the database interface framework (at operation 435). In an example, the database agent may receive query results from each of the at least one database prior to sending all the received query results (in some cases, either compiling the query results in a single file for sending to the database interface framework, or sending the individual query results to the database interface framework). Alternatively, the database agent may send query results from each of the at least one database as they are received, with the database interface framework collecting and compiling the query results from each of the at least one database after all have been received.

Referring to operations 440-475, for each of the at least one database, the database agent may evaluate a plurality of data retrieval paths for accessing the first data stored in that database (at operation 440); may select a first data retrieval path among the plurality of data retrieval paths, based on a first learning algorithm (at operation 445); may access the first data from that database, using the first data retrieval path (at operation 450); may monitor performance metrics (at operation 455), which may include at least one of response time, resource usage, or query success, and/or the like; and may monitor a current context (at operation 460), which may include at least one of current network conditions, current database load for that database, or query complexity of the first query, and/or the like; may receive reward points to the database agent when the first data retrieval path is determined to be an optimal path (at operation 465); may receive penalty points to the database agent (at operation 470); and may update the first learning algorithm based on whether the reward points or the penalty points are received by (or awarded to) the database agent for the first data retrieval path (at operation 475). In some examples, determining whether the first data retrieval path for accessing the first data from that database is an optimal path may be performed by the database interface framework, in some cases, based on analysis of the performance metrics and the current context for the database agent accessing the first data from that database. When the first data retrieval path is determined to be the optimal path, the database interface framework may award the reward points to the database agent, where the reward points are received by the database agent at operation 460. On the other hand, when the first data retrieval path is determined to not be the optimal path, the database interface framework may award the penalty points to the database agent, where the penalty points are received by the database agent at operation 465. In some examples, the database agents are configured to achieve a high number of points (e.g., a high number of reward points compared with a low number of penalty points). In some cases, for each database agents, any penalty points received or awarded are deducted from a current total of reward points. In examples, updating of the first learning algorithm based on whether the reward points or the penalty points are received by, or awarded to, the database agent for the first data retrieval path (at operation 470) may alternatively be performed by the database interface framework. In some examples, each database may have multiple database agents, with each database agent being instructed to achieve as large a number of reward points as possible In the manner above, the database agent approach enables improved query response times (primarily due to the retrieval path optimization and reward/penalty system) compared with traditional agents in databases that only process input data and output results.

While the techniques and procedures in methods 300, 400 are depicted and/or described in a certain order for purposes of illustration, it should be appreciated that certain procedures may be reordered and/or omitted within the scope of various embodiments. Moreover, while the methods 300, 400 may be implemented by or with (and, in some cases, are described below with respect to) the systems, examples, or embodiments 100 and 200 of FIGS. 1 and 2, respectively (or components thereof), such methods may also be implemented using any suitable hardware (or software) implementation. Similarly, while each of the systems, examples, or embodiments 100 and 200 of FIGS. 1 and 2, respectively (or components thereof), can operate according to the methods 300, 400 (e.g., by executing instructions embodied on a computer readable medium), the systems, examples, or embodiments 100 and 200 of FIGS. 1 and 2 can each also operate according to other modes of operation and/or perform other suitable procedures.

Exemplary System and Hardware Implementation

Figure 5:
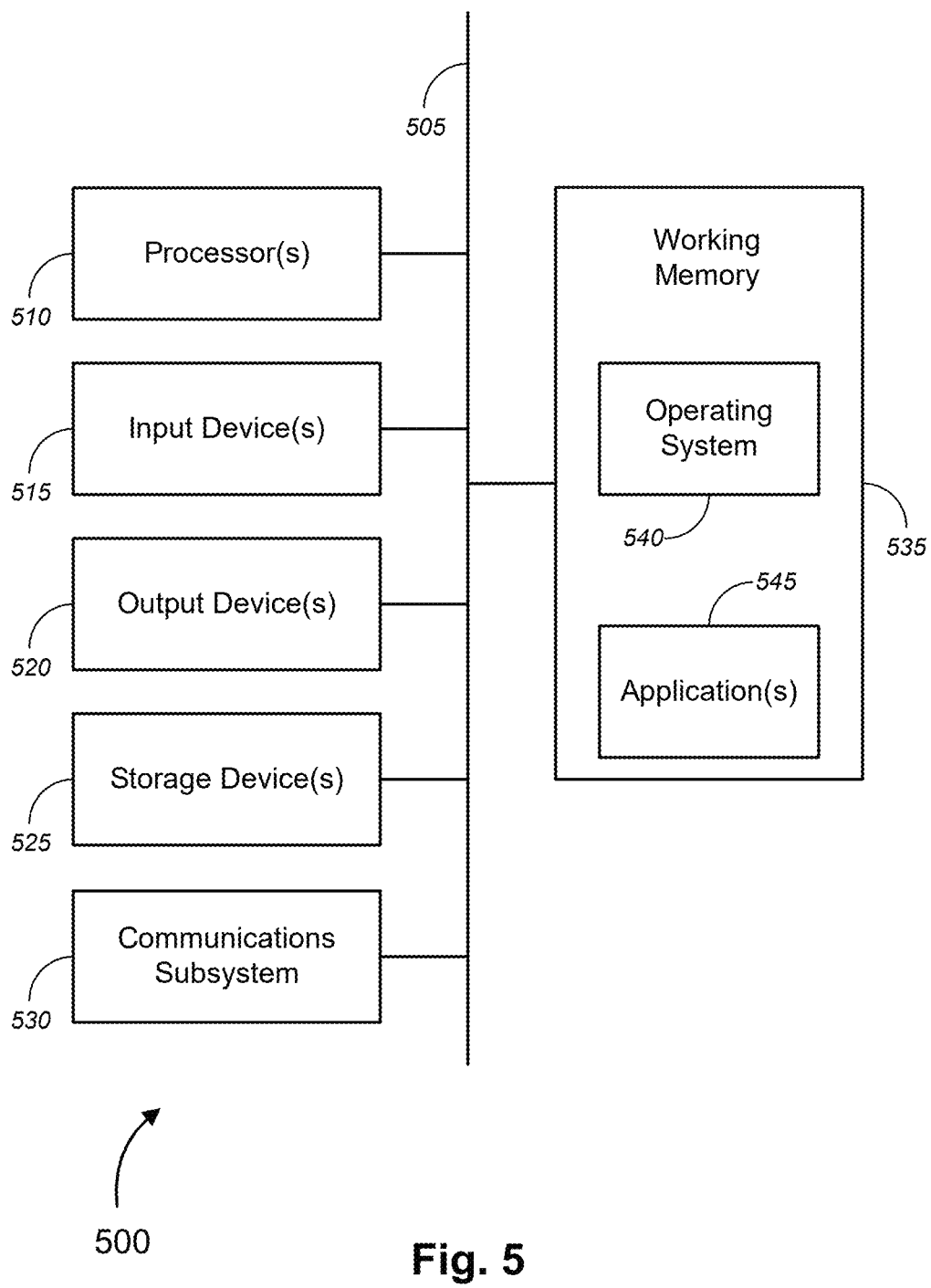
FIG. 5 depicts a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., database management system 105, database interface framework 110 or 205, authentication system 135a or 135b, AI system 140a or 140b, and requesting devices 145a-145x, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., database management system 105, database interface framework 110 or 205, authentication system 135a or 135b, AI system 140a or 140b, and requesting devices 145a-145x, etc.), described above with respect to FIGS. 1-4—is shown including hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can include, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a Wi-Fi device, a WiMAX device, a wireless wide area network ("WWAN") device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further include a working memory 535, which can include a RAM or ROM device, as described above.

The computer or hardware system 500 also may include software elements, shown as being currently located within the working memory 535, including an operating system 540, device drivers, executable libraries, and/or other code, such as one or more application programs 545, which may include computer programs provided by various embodiments (including, without limitation, hypervisors, virtual machines ("VMs"), and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that include the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
    receiving, by a database interface framework and from a requesting device, a first query for accessing first data stored in at least one database among a plurality of databases within a private data environment, the first query being a natural language ("NL") query, the plurality of databases including a combination of structured and unstructured databases, two or more of the plurality of databases using corresponding two or more query languages that are different from each other;
    causing, by the database interface framework, translation of the first query into a second query, from the NL query into a database agent query language that is used by a database agent within the private data environment, the database agent query language being different from the two or more query languages;
    sending, by the database interface framework, the second query to the database agent, the second query causing the database agent to, for each of the at least one database:
    translate the second query into a query language ("QL") query, from the database agent query language into a database query language that is used by that database among the at least one database;
    send the QL query to that database;
    receive query results from that database; and
    send the query results to the database interface framework;
    receiving, by the database interface framework, the query results from each of the at least one database, via the database agent;
    causing, by the database interface framework, translation of the query results for the at least one database into an NL response;
    sending, by the database interface framework, the NL response to the requesting device;
    for each of the at least one database,
        evaluating, by the database agent, a plurality of data retrieval paths for accessing the first data stored in that database;
        selecting, by the database agent, a first data retrieval path among the plurality of data retrieval paths, based on a first learning algorithm;
        accessing, by the database agent, the first data from that database, using the first data retrieval path;

monitoring, by the database agent, performance metrics, wherein the performance metrics includes at least one of response time, resource usage, or query success;

monitoring, by the database agent, a current context, wherein the current context includes at least one of current network conditions, current database load for that database, or query complexity of the first query;

determining, by the database interface framework, whether the first data retrieval path for accessing the first data from that database is an optimal path, based on analysis of the performance metrics and the current context for the database agent accessing the first data from that database;

performing one of:
when the first data retrieval path is determined to be the optimal path, awarding, by the database interface framework, reward points to the database agent; or
when the first data retrieval path is determined to not be the optimal path, awarding, by the database interface framework, penalty points to the database agent; and updating, by at least one of the database interface framework or the database agent, the first learning algorithm based on whether the reward points or the penalty points are awarded to the database agent for the first data retrieval path.

2. The method of claim 1, further comprising:
performing, by at least one of the database interface framework or the database agent, one or more of refining second data included in the query results, exporting the second data included in the query results, or creating a chart of the second data included in the query results, wherein the first data corresponds to the second data.

3. The method of claim 1, further comprising:
performing, by at least one of the database interface framework or the database agent, one or more of predictive maintenance, autonomous database management, advanced data insights, capacity planning, or NL query processing.

4. The method of claim 3, wherein the one or more of the predictive maintenance, the autonomous database management, the advanced data insights, the capacity planning, or the NL query processing are performed using at least one of one or more artificial intelligence ("AI") models or computational intelligence.

5. The method of claim 3,
wherein the predictive maintenance includes at least one of proactive issue resolution or workload forecasting;
wherein the autonomous database management includes at least one of database self-optimization or database self-healing;
wherein the advanced data insights include at least one of pattern recognition or advanced query recommendation;
wherein the capacity planning includes at least one of storage management or resource optimization; and
wherein the NL query processing includes at least one of AI-driven query conversion or context-aware assistance.

6. The method of claim 1, further comprising:
performing, by at least one of the database interface framework or the database agent, one or more of data retrieval and analysis, performance monitoring, sales gap identification, sales improvement recommendation, weakness identification, data masking, role-based access ("RBAC"), or active monitoring.

7. The method of claim 6,
wherein the data retrieval and analysis include at least one of automated data retrieval and reporting, or workflow streamlining through customer relationship management ("CRM") integration;
wherein the performance monitoring includes at least one of lifecycle event monitoring, sales feedback monitoring, or database monitoring;
wherein the sales gap identification includes at least one of identification of underperforming sales regions, identification of underperforming sales products, sales forecasting based on predictive analysis, sales planning based on predictive analysis, or sales strategy adjustment based on trends and market conditions; and
wherein the sales improvement recommendation includes at least one of data-driven identification of high-value customers, data-driven identification of trends, data-driven identification of profitable opportunities, or actionable recommendations that enhance conversion rates.

8. The method of claim 1, further comprising:
accessing, by the database interface framework, at least one of historical data or real-time performance metrics associated with operations of the at least one database;
identifying, by the database interface framework, whether metadata associated with a plurality of data stored on the at least one database indicates that the plurality of data includes out-of-date data, by analyzing the at least one of the historical data or the real-time performance metrics; and
based on a determination that the metadata associated with the plurality of data indicates that the plurality of data includes one or more data that are out-of-date, autonomously initiating, by the database interface framework, database self-optimization by causing retrieval of up-to-date data and updating the one or more data that are out-of-date with the retrieved up-to-date data.

9. The method of claim 1,
accessing, by the database interface framework, at least one of historical data or real-time performance metrics associated with operations of the at least one database;
identifying, by the database interface framework, whether the at least one database has database issues including at least one of a corrupted database index, a missing database index, or an inefficient database index query function; and
based on a determination that the at least one database has one or more database issues, autonomously initiating, by the database interface framework, database self-healing by autonomously identifying solutions to each of the one or more database issues and autonomously implementing the identified solutions for each of the one or more database issues.

10. The method of claim 9, further comprising:
training, by the database interface framework, an AI model to identify a plurality of corrupted database indexes based on a subset of example corrupted database indexes;
wherein the database self-healing is autonomously initiated using the trained AI model.

11. The method of claim 1, wherein the first query includes at least one of a text-based NL query, a chat-based NL query, a search engine-based NL query, an email-based NL query, a voice-based NL query, or a video-based NL query, wherein the first query is received from the requesting device via at least one of an interface connector, an application programming interface ("API"), or a portal.

12. The method of claim 1, further comprising:
    causing, by the database interface framework, initiation of an authentication process for authenticating a requesting user associated with the requesting device, by sending an authentication request for authenticating the requesting user to an authentication system;
    wherein causing translation of the first query into the second query is performed in response to receiving an indication that the requesting user is authenticated.

13. The method of claim 1, further comprising:
    providing, by the database interface framework, the database agent with access to database features including at least one of database self-configuration, database self-healing, database self-optimization, database self-protection, or data integrity.

14. A system, comprising:
    a database interface framework, the database interface framework executing a first set of computer executable instructions that cause the database interface framework to perform first operations; and
    one or more database agents, each database agent executing a second set of computer executable instructions that cause that database agent to perform second operations;
    wherein the first operations comprise:
    receiving, from a requesting device, a first query for accessing first data stored in at least one database among a plurality of databases within a private data environment, the first query being a natural language ("NL") query, the plurality of databases including a combination of structured and unstructured databases, two or more of the databases using corresponding two or more query languages that are different from each other;
    causing translation of the first query into a second query, from the NL query into a database agent query language that is used by a first database agent among the one or more database agents, the database agent query language being different from the two or more query languages;
    sending the second query to the first database agent;
    wherein the second operations comprise:
    receiving the second query from the database interface framework; and
    for each of the at least one database,
    translating the second query into a query language ("QL") query, from the database agent query language into a database query language that is used by that database among the at least one database;
    sending the QL query to that database;
    receiving query results from that database; and
    sending the query results to the database interface framework;
    wherein the first operations further comprise:
    receiving the query results from each of the at least one database, via the first database agent;
    causing translation of the query results for the at least one database into an NL response;
    sending, by the database interface framework, the NL response to the requesting device; and
    for each of the at least one database,
    evaluating, by the database agent, a plurality of data retrieval paths for accessing the first data stored in that database;
    selecting, by the database agent, a first data retrieval path among the plurality of data retrieval paths, based on a first learning algorithm;
    accessing, by the database agent, the first data from that database, using the first data retrieval path;
    monitoring, by the database agent, performance metrics, wherein the performance metrics includes at least one of response time, resource usage, or query success;
    monitoring, by the database agent, a current context, wherein the current context includes at least one of current network conditions, current database load for that database, or query complexity of the first query;
    determining, by the database interface framework, whether the first data retrieval path for accessing the first data from that database is an optimal path, based on analysis of the performance metrics and the current context for the database agent accessing the first data from that database;
    performing one of:
    when the first data retrieval path is determined to be the optimal path, awarding, by the database interface framework, reward points to the database agent; or
    when the first data retrieval path is determined to not be the optimal path, awarding, by the database interface framework, penalty points to the database agent; and
    updating, by at least one of the database interface framework or the database agent, the first learning algorithm based on whether the reward points or the penalty points are awarded to the database agent for the first data retrieval path.

15. The system of claim 14, wherein the first operations further comprise:
    accessing, by the database interface framework, at least one of historical data or real-time performance metrics associated with operations of the at least one database;
    identifying, by the database interface framework, whether metadata associated with a plurality of data stored on the at least one database indicates that the plurality of data includes out-of-date data, by analyzing the at least one of the historical data or the real-time performance metrics; and
    based on a determination that the metadata associated with the plurality of data indicates that the plurality of data includes one or more data that are out-of-date, autonomously initiating, by the database interface framework, database self-optimization by causing retrieval of up-to-date data and updating the one or more data that are out-of-date with the retrieved up-to-date data.

16. The system of claim 14, wherein the first operations further comprise:
    accessing, by the database interface framework, at least one of historical data or real-time performance metrics associated with operations of the at least one database;
    identifying, by the database interface framework, whether the at least one database has database issues including at least one of a corrupted database index, a missing database index, or an inefficient database index query function; and
    based on a determination that the at least one database has one or more database issues, autonomously initiating, by the database interface framework, database self-healing by autonomously identifying solutions to each of the one or more database issues and autonomously implementing the identified solutions for each of the one or more database issues, wherein the database self-healing is autonomously initiated using a trained AI model.

17. A method, comprising:

receiving, by a database agent and from a database interface framework, a first query for accessing first data stored in at least one database among a plurality of databases within a private data environment, the first query being in a database agent query language, the plurality of databases including a combination of structured and unstructured databases, two or more of the databases using corresponding two or more query languages that are different from each other and from the database agent query language;

for each of at least database among the plurality of databases, determining, by the database agent, a database query language that is used by that database among the at least one database;

translating, by the database agent, the first query into a query language ("QL") query, from the database agent query language into the database query language that is used by that database;

sending, by the database agent, the QL query to that database;

receiving, by the database agent, query results from that database;

sending, by the database agent, the query results to the database interface framework; and for each of the at least one database, evaluating, by the database agent, a plurality of data retrieval paths for accessing the first data stored in that database;

selecting, by the database agent, a first data retrieval path among the plurality of data retrieval paths, based on a first learning algorithm;

accessing, by the database agent, the first data from that database, using the first data retrieval path;

monitoring, by the database agent, performance metrics, wherein the performance metrics includes at least one of response time, resource usage, or query success;

monitoring, by the database agent, a current context, wherein the current context includes at least one of current network conditions, current database load for that database, or query complexity of the first query;

when the first data retrieval path is determined to be an optimal path, receiving, by the database agent, reward points;

when the first data retrieval path is determined to not be the optimal path, receiving, by the database agent, penalty points; and updating, by the database agent, the first learning algorithm based on whether the reward points or the penalty points are received by, or awarded to, the database agent for the first data retrieval path.

18. The method of claim 17, further comprising:

performing, by the database agent, at least one of database self-configuration, database self-healing, database self-optimization, database self-protection, or data integrity on data stored in the at least one database.

* * * * *